Aug. 28, 1962 J. ARTHUR 3,051,937

MESSAGE REGISTER READER

Filed April 12, 1957 2 Sheets-Sheet 1

INVENTOR.
JAMES ARTHUR
BY
Kenyon & Kenyon
ATTORNEYS

MESSAGE REGISTER READER

INVENTOR.
JAMES ARTHUR
BY
Kenyon & Kenyon
ATTORNEYS

United States Patent Office 3,051,937
Patented Aug. 28, 1962

3,051,937
MESSAGE REGISTER READER

James Arthur, 921 Madison Ave., Plainfield, N.J.

Filed Apr. 12, 1957, Ser. No. 652,593
2 Claims. (Cl. 340—332)

The present invention relates generally to electrically illuminated readers for scanning a film strip, and more particularly to a device adapted selectively to display telephone message units appearing on a film strip to facilitate the reading thereof.

In modern automatic telephone systems, the subscriber's monthly bill is measured in terms of message units consumed. The total number of message units charged for a particular call depends both on the place called and the duration of the call. Counters are provided in conjunction with the dial system which operate to register the number of units chargeable to each subscriber. The difference between the counter reading at the beginning and end of the month represents the chargeable number of message units.

For purposes of monthly billing it is the present practice to print or photograph the counter reading on a translucent film or tape. The code number of each subscriber and the message unit total are exhibited in a separate block on the film, there being several rows of such blocks. In order to bill the subscriber, a clerk must read off the message unit from the film and place appropriate punches or marks on a record card which is then inserted in a business machine responsive to the markings and adapted to prepare the bill.

The counter reading is of course mechanically determined and is free of human error. Similarly, if the punches on the record card are properly applied and reflect the counter reading, no error will normally arise in the preparation of the bill. However, since a clerk serves to convert the counter reading into punches symbolic thereof, it is important that this reading be clearly presented so as to minimize human error. Since the readings appear in rows on a film, the clerk is called upon to scan the film carefully and to shift his eyes from block to block to pick off the individual readings. This visual operation is difficult to perform accurately for sustained periods and errors frequently arise. Moreover, the film is normally illuminated by reflected lights and this contributes to eye strain and operator fatigue.

In view of the foregoing, it is the principal object of the present invention to provide a message register reader for selectively scanning a film strip bearing indicia by means of light transmitted therethrough. The use of transmitted light rather than reflected light serves to reduce eye strain.

More particularly it is an object of the invention to provide a reader constituted by a grid or honeycomb structure formed by a multiplicity of cells which correspond in position with a like plurality of subscriber blocks contained in a film strip placed thereover, the cells being selectively illuminated to light up one or more blocks at a time.

Also an object of the invention is to provide a reader as above described in which the film blocks may be illuminated in any desired sequence or order to facilitate reading off operations. The lights can be made to ignite one at a time and the number of lights as well as which light should ignite and the sequence in which the lights ignite can be automatically controlled by pre-setting certain switches. A significant feature of the invention resides in the use of an external triggering circuit for operating the selective system.

It is also an object of the invention to provide a message register reader which is efficient and reliable in operation and which may be manufactured at relatively low cost.

Briefly stated, a reader in accordance with the invention comprises a honeycomb structure defined by an array of individual light cells. A film carrier serves to convey the film across the light array, the film being provided with parallel rows of blocks containing the information to be read. The multiple cell orientation is such as to correspond with the pattern of blocks. Selective switching means are provided in connection with the light cells to render the lights operative in any desired sequence whereby the blocks may be scanned sequentially one row at a time or in any other desired order.

For a better understanding of the invention as well as other objects and further features thereof, reference is made to the following detailed description to be read in conjunction with the accompanying drawings wherein like components in the several views are represented by like reference numerals.

Figures 1, 2, 3:
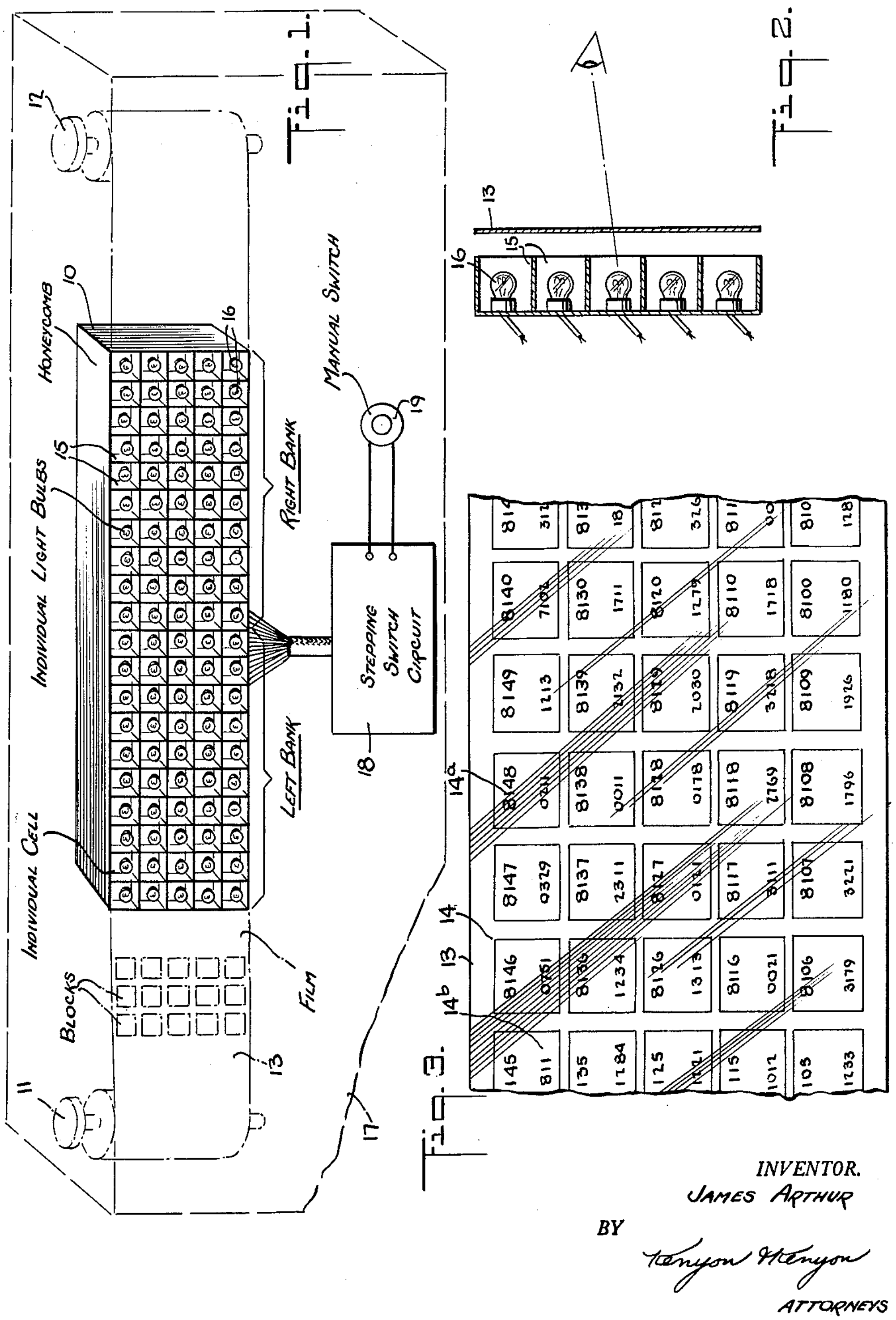
FIG. 1 is a schematic representation in perspective of a message register reader in accordance with the invention.
FIG. 2 is a side view of the reader.
FIG. 3 shows a segment of the film being read.

Referring now to the drawing and more particularly to FIG. 1, the reader comprises a honeycomb structure, generally represented by numeral 10, and a film carrier including a rotatable supply spool 11 disposed to one side of the honeycomb and a take-up spool 12 disposed on the other side, both spools having manual knobs. The film print web 13 spans the two spools to cover the honeycomb structure.

As shown separately in FIG. 3, the film print web 13, which may be a positive or negative, has impressed thereon five longitudinally extending rows of blocks 14, each block containing a code number **14*a* indicative of the particular subscriber to be billed and a counter reading 14*b* representing the number of message units registered. Honeycomb 10 is divided into five parallel rows of cells 15, each containing an electric light bulb 16**. There are twenty cells in each row, hence one hundred cells in the entire honeycomb. The fifty cells in the left half of the honeycomb are referred to as the left bank LB, and the remaining fifty on the right half as the right bank RB. The dimensions and arrangement of the cells are such as to match the blocks on the film.

The reader may be mounted in a suitable casing 17 having a viewing window exposing that portion of the film overlapping the honeycomb. The knobs of the spools 11 and 12 project above the casing for manual control. The arrangement is such as to permit the read-off of 100 blocks on the film, and upon completion of this operation, the film strip is advanced by means of the take-up spool to dispose the next 100 blocks into operative position. It is to be understood that the invention is not limited to this number and may readily be adapted to operate with films having a greater or smaller number of rows.

The individual cells 15, as best seen in FIG. 2, are formed by partitioning walls arranged in a grid-like structure to constitute an array of open cubicles of square configuration, each housing an individual incandescent lamp 16. Thus when a given lamp is energized, a light square is formed behind the corresponding block on film 13, thereby illuminating this block by light transmission to the exclusion of all others. The viewer is able therefore to read off the illuminated block without distraction from adjacent blocks which remain unilluminated. Since the light is transmitted through the film, glare is avoided.

The bulbs 16 are energized by means of a selective switching circuit 18 including an advance switch 19 which when actuated causes energization of the next bulb in the predetermined order of operation.

The order of operation is adjustable so that various scanning patterns are possible. For example, the bulb may be ignited in a row-by-row sequence, starting with the top row and running from left to right and continuing with the rows below until all 100 lamps are illuminated in turn. Or the scanning may be such as sequentially to energize the lamps in the left or right bank before shifting over to the next bank. The choice of scanning pattern obviously is a matter of operational convenience and the switching circuit illustrated in FIG. 4 is designed to afford a range of scanning possibilities.

Figure 4:
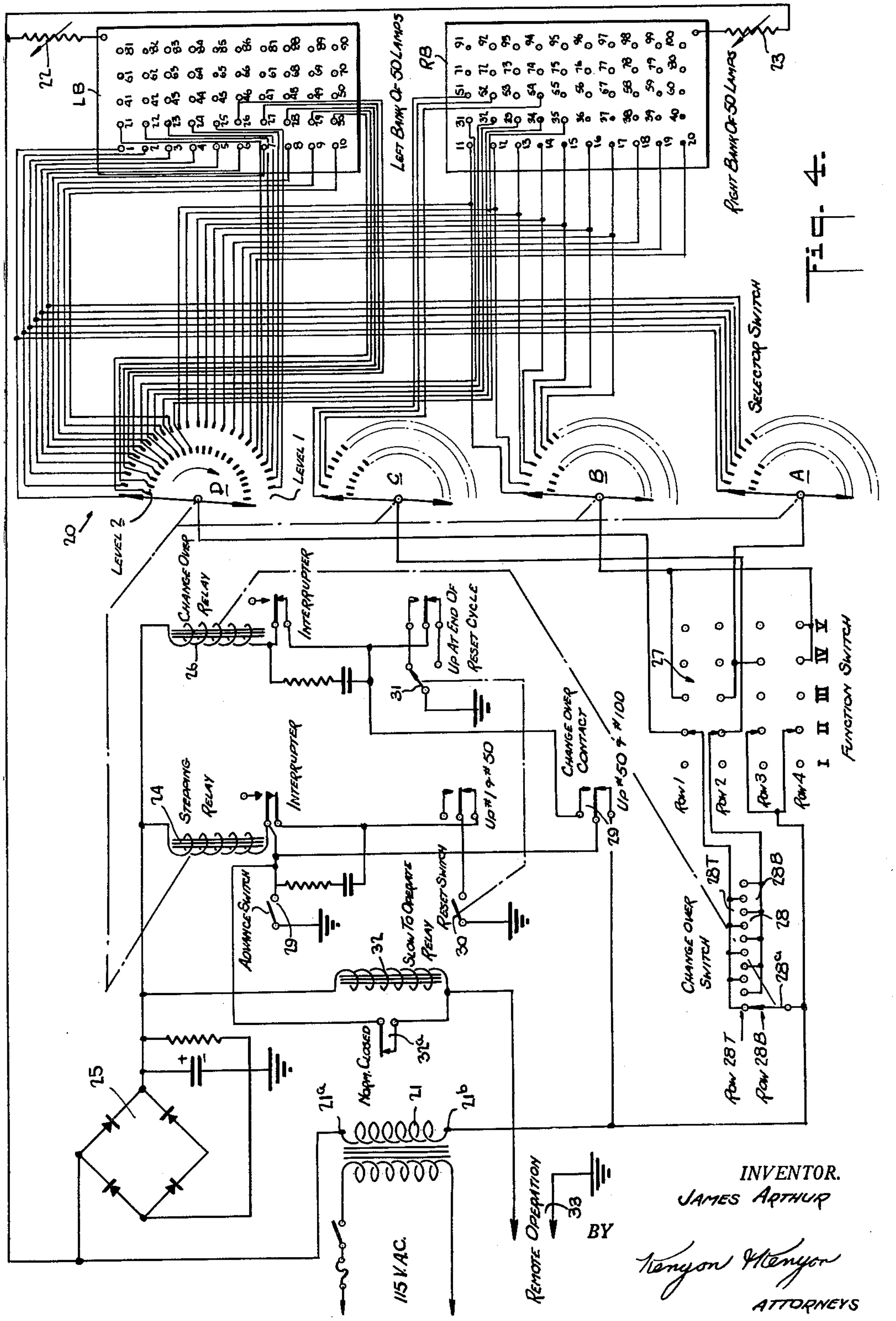
FIG. 4 is a schematic circuit diagram of the selective switching arrangement for the reader lights.

Referring now to FIG. 4, the stepping switch circuit includes a selector switch 20 which has four banks of contacts A, B, C and D, each bank including two contact levels 1 and 2 engaged by a movable contact arm. The switch has 50 positions and is continuously rotatable through 360°. The left and right banks LB and RB of bulbs 16 are enclosed in separate boxes in the drawing for purpose of clarity. The bulbs are numbered serially row-by-row, bulbs 1 to 10, 21 to 30, 41 to 50, 61 to 70 and 81 to 90 lying in the left bank LB and 11 to 20, 31 to 40, 51 to 60, 71 to 80 and 91 to 100 lying in the right bank RB.

The bulbs, which may be of flashlight size, are energized from a step-down transformer 21 connected to the alternating-current line, one terminal of each lamp in the left bank being connected through a variable resistor 22 to one end **21*a* of the transformer secondary and one terminal of each lamp in the right bank being connected through a variable resistor 23 to the same end of the secondary. The other terminals of the lamps are connected to the other end 21*b* of the secondary through the banks of the selector switch 20 for energization in a desired sequence. The resistors 22 and 23** act as light intensity controls and may be manually controlled by the operator.

The contacts in bank A of selector switch 20 are wired to the left bank of 50 lamps, those in bank B are wired to the right bank of 50 lamps, and those in banks C and D are wired both to the right and left banks of the lamps.

The selector switch 20 is driven in a stepwise manner by a stepping relay 24 which is connected to the secondary of transformer 21 through a bridge rectifier and filter circuit 25 whereby the solenoid of the relay is energized by direct current. The movable contact arms of the four banks of the selector switch are ganged together for concurrent movement so that each time relay 24 is energized, the arms are advanced one step. Also energized by the direct-current from the rectifier circuit is a change-over relay 26 whose function will be later explained.

The various scanning patterns are controlled by a five position, function switch 27 having four rows 1 to 4 of fixed contacts and four movable contacts for engaging the fixed contacts. The five positions of the function switch 27 act as follows: At position I, the circuit is inoperative, this being the off position. At position II, the lamps are scanned row by row in direct numerical sequence from 1 to 100. At position III, the 50 lamps in the left bank are scanned first and then the 50 lamps in the right bank are scanned. The numerical order therefore is 1 to 10, 21 to 30, 41 to 50, 61 to 70, 81 to 90, 11 to 20, 31 to 40, 51 to 60, 71 to 80 and 91 to 100. At position IV, the 50 lamps in the left bank and the 50 lamps in the right bank are scanned in pairs. The order therefore is 1+11, 2+12, 3+13, 4+14, 5+15, etc. Finally, at position V, only the 50 lamps in the left bank are scanned. The order is 1 to 10, 21 to 30, 41 to 50, 61 to 70 and 81 to 90.

In order to effect the desired scanning sequences, the connections of the movable contact arms in banks A to D on the selector switch 20 are as follows: The movable contact arm on bank A of selector switch 20 is connected both to the row 2-position III and row 3-position IV fixed contacts on function switch 27. The movable contact arm on bank B is connected both to the row 1-position III and row 4-positions IV and V fixed contacts on function switch 27. The movable contact arms on bank C are connected to the row 2-position II fixed contact on function switch 27. The movable contact arm on bank D is connected to the row 1-position II on the function switch 27.

The change-over relay 26 acts through a change-over switch 28 to connect the contact banks of the selector switch 20 chosen by the function switch 27 to the secondary terminal **21*b* of transformer 21. Changeover switch 28 is constituted by two rows 28T and 28B of fixed contacts alternately arranged with reference to a movable contact 28*a* such that first a fixed contact from the top row is engaged, then a fixed contact from the bottom row and so on. The movable contact in row 1 of function switch 27 is connected to the top row contacts 28T of the changeover switch 28. The movable contact in row 2 of function switch 27 is connected to the bottom row contacts 28B of the changeover switch 28. The movable contact 28*a* of the changeover switch, as well as the movable contacts in rows 3 and 4 of the function switch 27 are connected to the secondary terminal 21*b* of transformer 21. When the movable contact 28*a* engages a fixed contact in row 28, the alternating current is fed to the bank of the selector switch 20 in row 1 of the function switch 27** contacted by the movable contact therein.

The stepping relay 24 is caused to move one step forward by means of an advance switch 29 which when closed completes the D.-C. power circuit between the rectifier 25 and the relay winding. The stepping relay at the 50th and also at the 100th step acts to operate a changeover contact 29 to apply the D.-C. voltage to the changeover relay 26 to actuate changeover switch 28, thereby effecting a switch-over from one bank of the selector switch 20 to another.

Resetting of the system is effected by reset switches 30 and 31 which are ganged together.

A slow acting or time delay relay 32 permits external automatic triggering of the stepping circuit with either a momentary "on" or momentary "off" input pulse, without further setting or change in circuit. Remote operation is effected through terminals 33 connected through the normally closed contacts **32*a* of the time delay relay 32 to the stepping relay 24, such that momentary actuation at the remote point effects energization of the stepping relay. But should the actuation be maintained, relay 32** will be actuated to break the circuit.

The stepping circuit can be triggered automatically by tying in with the IBM business machine for processing the punch cards or externally either manually or pedally without disconnecting the automatic circuit. The system can be reset in the same manner.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In reader apparatus for selectively illuminating indicia appearing in blocks on a translucent medium and arranged in uniform rows thereon, the medium being placed over an array of electric lights arranged in rows corresponding to the blocks on said medium whereby upon activation of a light the related block is illuminated by light transmitted through said medium; an electrical circuit arrangement to activate said lights in a predetermined order selected from a plurality of different scanning patterns and comprising a selector switch having multiple banks of contacts connected to said array of lights for selectively coupling same to an electrical power supply, a stepping relay for actuating said contacts one step at a time, and a multi-position function switch providing at each position thereof a different scanning pattern to effect activation of said lights in different orders, and means interposing said function switch between said banks on said selector switch and said power supply to effect scanning of said lights in an order determined by the position of said function switch.

2. Apparatus, as set forth in claim 1, further including a remote control circuit adapted to actuate said selector switch in response to a pulsatory action.

References Cited in the file of this patent

UNITED STATES PATENTS

| | | |
|---|---|---|
| 450,615 | Delany | Apr. 21, 1891 |
| 1,728,997 | Johnson | Sept. 24, 1929 |
| 2,355,352 | Willis | Aug. 8, 1944 |
| 2,576,836 | Hilsinger | Nov. 27, 1951 |
| 2,644,063 | Zikmund | June 30, 1953 |